United States Patent
Wenisch

(10) Patent No.: US 7,162,714 B2
(45) Date of Patent: Jan. 9, 2007

(54) SOFTWARE-BASED WATCHDOG METHOD AND APPARATUS

(75) Inventor: Thomas F. Wenisch, Pittsburgh, PA (US)

(73) Assignee: American Power Conversion Corporation, West Kingston, RI (US)

( * ) Notice: Subject to any disclaimer, the term of this patent is extended or adjusted under 35 U.S.C. 154(b) by 426 days.

(21) Appl. No.: 10/153,274

(22) Filed: May 22, 2002

(65) Prior Publication Data

US 2003/0221141 A1 Nov. 27, 2003

(51) Int. Cl.
G06F 9/44 (2006.01)
H02H 3/05 (2006.01)

(52) U.S. Cl. .............. 717/127; 714/2; 714/48

(58) Field of Classification Search ........ 717/124–135; 714/100, 2, 4, 5, 10, 38, 55, 48–51, 47, 40; 709/224; 719/318, 328; 718/1, 100, 106
See application file for complete search history.

(56) References Cited

U.S. PATENT DOCUMENTS

| 4,916,698 | A |   | 4/1990 | McCann ............... 371/16.3 |
| 5,590,277 | A | * | 12/1996 | Fuchs et al. ............... 714/38 |
| 5,630,047 | A | * | 5/1997 | Wang ..................... 714/15 |
| 5,649,098 | A |   | 7/1997 | Shieh et al. .......... 395/185.08 |
| 5,761,414 | A |   | 6/1998 | Akaishi et al. ........ 395/185.08 |
| 5,951,622 | A |   | 9/1999 | Nomura ................. 710/107 |
| 6,105,148 | A | * | 8/2000 | Chung et al. ............. 714/16 |
| 6,269,478 | B1 | * | 7/2001 | Lautenbach-Lampe et al. .................. 717/127 |
| 2001/0042227 | A1 | * | 11/2001 | Stephenson et al. ......... 714/47 |
| 2002/0032879 | A1 | * | 3/2002 | Sun et al. .................. 714/2 |
| 2002/0087687 | A1 | * | 7/2002 | Zaifman et al. ........... 709/225 |
| 2002/0129042 | A1 | * | 9/2002 | Bradshaw et al. ......... 707/200 |
| 2002/0184295 | A1 | * | 12/2002 | Bartley ................... 709/107 |

OTHER PUBLICATIONS

Genduso-Turner, Computer System Performance Monitor, Sep. 1990, IBM® Technical Disclosure Bulletin, vol. 33, No. 4.*
Brew-Harris, Hardware Feature Detection and Configuration with Failsafe Checkpointing, Dec. 1995, IBM® Technical Disclosure Bulletin, vol. 38, No. 12.*
Butler-Cobbett-Lozinski-Staton, Monitoring Abnormal Process Termination in Multi-Process Systems, Jul. 1995, IBM® Technical Disclosure Bulletin, vol. 38, No. 7.*

* cited by examiner

Primary Examiner—Antony Nguyen-Ba
(74) Attorney, Agent, or Firm—Mintz, Levin, Cohn, Ferris, Glovsky and Popeo, P.C.

(57) ABSTRACT

In a computer system which allows simultaneous operations of multiple processes, a software watchdog process operates to monitor a primary process through operating system calls. If the response to an operating system call shows that the primary process is not operating or is over utilizing CPU time, then the primary process is restarted. The software watchdog process may also check and correct configuration and data files before restarting the primary process. Alternatively, rather than using operating system calls, the software watchdog process and primary process may communicate through a loop back TCP/IP address for monitoring purposes.

27 Claims, 2 Drawing Sheets

SOFTWARE-BASED WATCHDOG METHOD AND APPARATUS

BACKGROUND OF THE INVENTION

1. Field of the Invention

The present invention relates to software monitoring processes. More particularly, it relates to watchdog processes, which monitor the operation of other processes and restart the other processes, as necessary, to maintain proper operation.

2. Discussion of Related Art

Computer processes have been known to occasionally have operating problems. Errors in operation can cause a process to fail or cease to execute. A process may enter a non-exiting loop, or may lose data and cease operation. In order to maintain proper operation, monitoring processes, called watchdog processes, have been used to track operation of another process. When the watchdog process determines that there is a operating problem, it will interrupt the watched process and restart it. In this manner, the main process will be maintained as operating.

Known watchdog processes have been implemented using circuits separate from those implementing the main process. Typically, these circuits include a counter which is periodically reset by the main process. If the main process fails, then the timer is not reset. Once the timer expires, the watchdog process determines that the main process has failed and operates to restart the process. Such watchdog processes are implemented using a hardware circuit or a separate processor and appropriate software. While these processes assist in preventing the total loss of the main process, they lack the ability to adequately determine or resolve various processing problems. For example, a main process could hang in a loop which resets the timer. Thus, even though the main process has failed, it would not trigger the watchdog process. Therefore, a need exists for a watchdog process which can monitor a main process independent of the type of error.

Furthermore, the watchdog process cannot determine or correct the error which caused the problem. This can result in the main process failing again after it is restarted. Therefore, a need exists for a watchdog process which can monitor and correct errors which cause the main process to fail.

Furthermore, for known watchdog processes, the main program must reset the timer of the watchdog process. Thus, the main program must be designed to operate with the watchdog process. The watchdog process cannot operate to monitor other programs. Also, each watchdog timer can only be used to monitor a single program. Therefore, a need exists for a watchdog process which can monitor any program and multiple programs.

Finally, the watchdog process itself may fail. If the watchdog process fails, the main process could also fail without being monitored. Therefore, a need exists for a watchdog process which can also be monitored.

SUMMARY OF THE INVENTION

The deficiencies of known watchdog processes are substantially overcome with the system of the present invention through the utilization of a software implemented watchdog process. According to one aspect of the invention a distinct software process operating on the same CPU as a primary process uses calls to the operating system to monitor the operation of a primary process. If the primary process is not executing, or is over utilizing CPU time, it is determined to be non-operating. The primary process is restarted. According to another aspect of the invention, the watchdog process can check and correct damaged configuration or data files used by the primary process before restarting. According to another aspect of the invention, the watchdog process can be used to monitor and restart various primary processes operating on a single computer system. According to another aspect of the invention, a secondary software watchdog process can be included as part of a primary process for fault tolerant operation. The secondary software watchdog process monitors the primary watchdog process to ensure continued operation.

According to another aspect of the present invention, the primary process and watchdog process communicate information through a loop back TCP/IP address. In this manner, the primary process and watchdog process can periodically send messages. If the watchdog process does not receive a message from the primary process within a certain predetermined time, the watchdog process determines that the primary process is not operating properly and restarts the primary process.

DETAILED DESCRIPTION OF PREFERRED EMBODIMENTS

Figure 1:
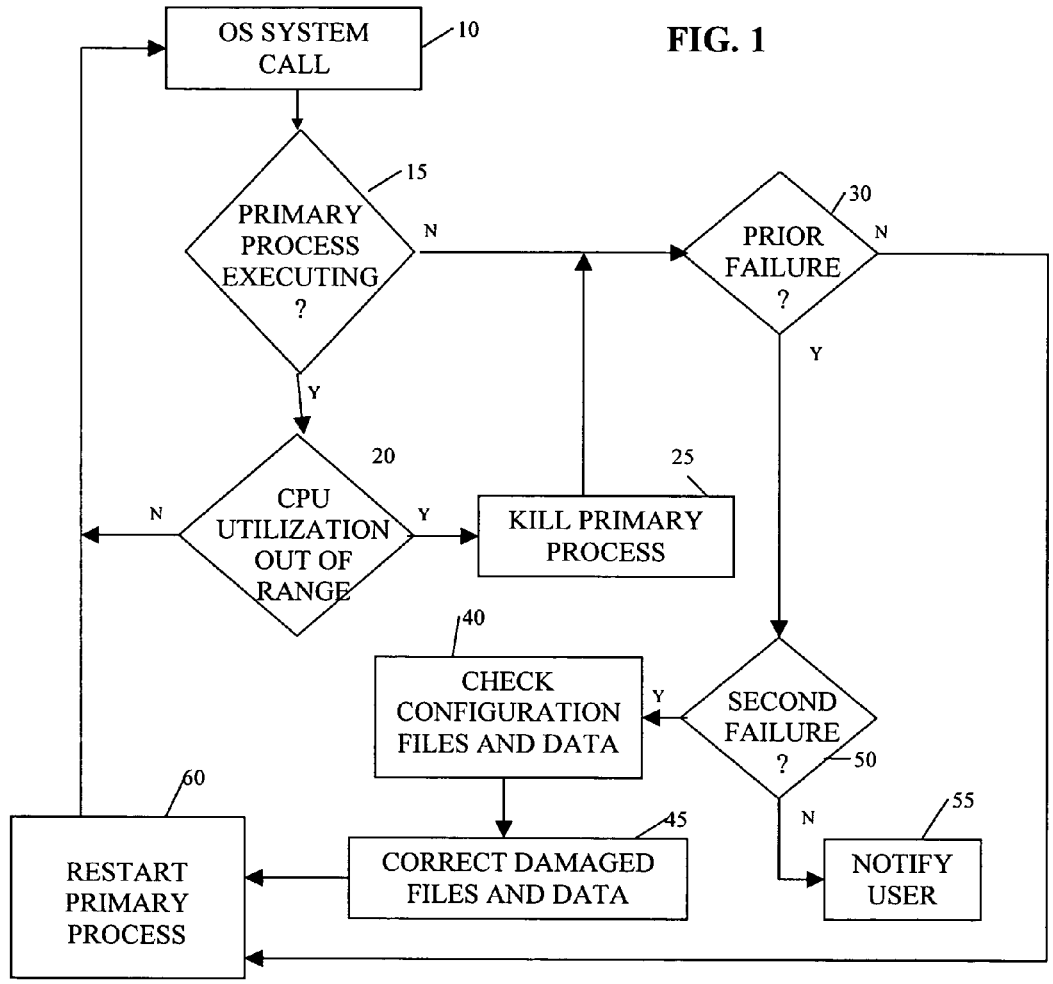
FIG. 1 is a block flow diagram for operation of a watchdog process according to an embodiment of the present invention.

FIG. 1 illustrates operation of a software watchdog process according to an embodiment of the present invention. The software watchdog process of the present invention may be implemented in any known computer system which allows simultaneous operation of processes. Such computer systems include personal computers, servers and mainframe computers. Furthermore, to utilize the present invention, according to the first embodiment, the computer system must include an operating system which collects and provides information about process operation. The Windows® NT and Windows® 2000 operating systems from Microsoft® Corporation have such functionality. Other operating systems also provide similar functionality. Additionally, the software watchdog process may be created in any known programming language. Preferably, the software watchdog process is stored in the memory of the computer system and is automatically accessed and operated when the computer system is started or when the primary process is started.

As illustrated in FIG. 1, at step 10, the software watchdog process utilizes an operating system call for information relating to at least one primary process. The relevant information for the present invention is whether the primary process is a currently executing process and the CPU utilization rate for the primary process. The software watchdog process utilizes the operating system call on a periodic basis. The period for making operating system calls depends upon the desired operation of the computer system using the watchdog process. More frequent operating system calls will discover malfunctioning programs more rapidly, but will slow down ordinary operation of the system. At steps 15 and 20, the results of the operating system call are reviewed to determine whether the primary process is functioning properly. At step 15, the watchdog process checks whether the primary process is executing. This determination is made based upon the operating systems' listing of currently operating processes. If the primary process is not executing, the watchdog process begins a recovery procedure at step 30. If the primary process is executing, then, at step 20, the watchdog process determines the CPU usage of the primary process. If the primary process is in a loop such that it is over utilizing CPU time, then the process is determined to be non-functioning. The determination may be based upon a certain utilization amount of CPU time, or may monitor CPU usage over some time period to see an increase. Alternatively, an extremely low CPU utilization may also signify an error and may be used to initiate the recovery process. If the primary process is functioning within expected limits, the watchdog process returns to step 10 to perform another operating system call.

The recovery procedure within the watchdog process is illustrated in steps 25-60. If the primary process is executing but over utilizing CPU time, the process is first terminated at step 25. The primary process can be terminated using an operating system instruction to stop execution of the primary process. After terminating the primary process (step 25) or if the primary process is not executing (step 15), the watchdog process determines whether a prior failure has occurred at step 30. Preferably, a prior failure is only considered if it occurred within a predetermined time of the current failure. This ensures that the primary process is not repeatedly restarted only to fail again. If a prior failure has not occurred, the watchdog process restarts the primary process at step 60. If a prior failure has occurred, the watchdog process determines whether the present failure is the second failure at step 50. If it is the second failure, the watchdog process checks, at step 40, the configuration files and/or data for the primary process for errors. The watchdog process may also correct the configuration files or data at step 45. Alternatively, the watchdog process may reset the configuration files and/or data to known or initial values. Following correction, the primary process is restarted at step 60.

If the primary process fails a third time, after the configuration files and data have been corrected, then the watchdog process is unable to correct the error or restart the process. Accordingly, at step 55, a user is notified of the problem. Different types of notification can be used based upon the design of the computer system. For example, if the watchdog process is operating on a personal computer, a pop-up window can be displayed on the monitor with information regarding the problem. Alternatively, for a system attached to a network, an email notification could be provided to a specified user address.

The software process according to the present invention can operate with any known primary process. Since the determination of failure is based upon information from the operating system, the watchdog process need only have the primary process name as used by the operating system. Additionally, the watchdog process could be used to monitor more than one primary process. Each primary process would be analyzed and restarted, when appropriate, using the procedures as illustrated in FIG. 1. Furthermore, the present invention is not limited to the recovery steps illustrated in FIG. 1. Based upon the computer system and the process or processes being monitored, the watchdog process can be implemented to take any other steps to correct errors or resolve problems in restarting a process. For example, the watchdog process could verify dependencies that the primary process has on other system components, such as required DLLs. Furthermore, the watchdog process may capture and store information regarding operation of the principal process for debugging or failure analysis purposes.

Figure 2:
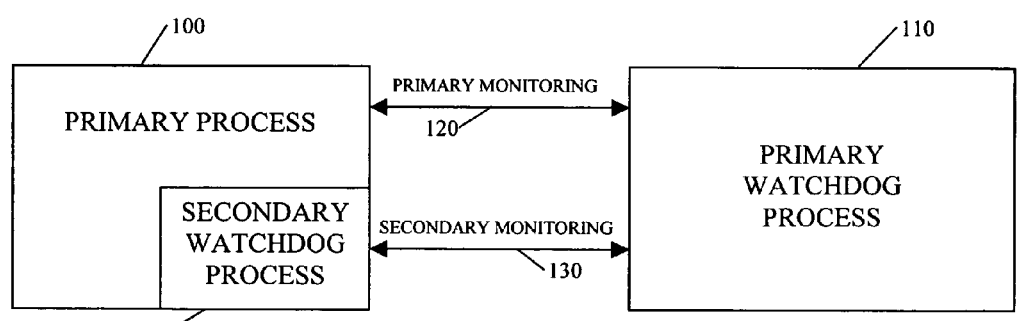
FIG. 2 is a block diagram of the relationship between processes according to a second embodiment of the present invention.

Since the watchdog process of the present invention is software based, it can be included as a part of any software process. A second embodiment of the present invention is illustrated in FIG. 2. In this embodiment, a secondary watchdog process 140 is embedded in the primary process 100. The secondary watchdog process 140 is used to monitor 130 the primary watchdog process 110. The primary watchdog process 110 is used to monitor 120 the primary process 100. In the first embodiment set forth above, if the primary process 100 fails, the failure is detected by the primary watchdog process 110, and the primary process 100 is restarted. However, if the primary watchdog process 110 were to fail first, then a failure of the primary process 100 would not be detected or corrected. Thus, the secondary watchdog process 140, within the primary process 100, is used to ensure that the primary watchdog process 110 remains functioning. Of course, a secondary watchdog process which is separate from the primary process could also be used, but it would still need to be monitored for proper operation. By embedding the watchdog process in the primary process, only one separate watchdog process is needed to maintain failsafe operation.

Figure 3:
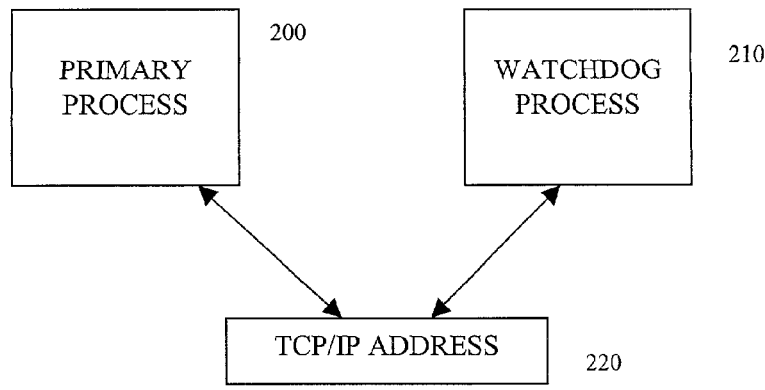
FIG. 3 is a block diagram of the relationship between processes according to a third embodiment of the present invention.
Figure 4:
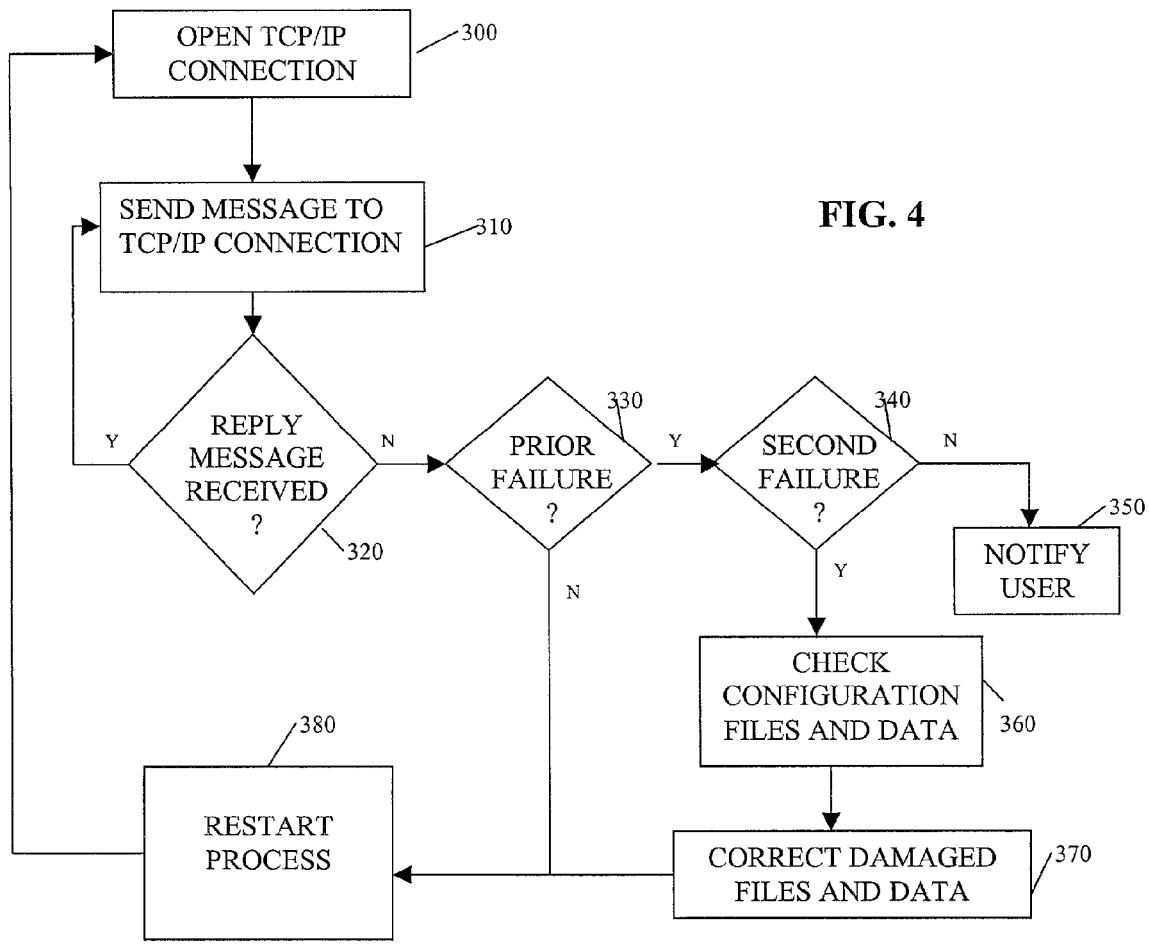
FIG. 4 is a block flow diagram for operation of a watchdog process according to the third embodiment of the present invention.

A third embodiment of the present invention is illustrated in FIG. 3. In this embodiment, the primary process 200 is designed to operate in conjunction with the watchdog process 210. The primary process and watchdog process communicate so that the performance of the primary process can be directly monitored. The processes communicate through a TCP/IP connection 220. Upon startup, the primary process 200 and the watchdog process 210 open a TCP/IP connection 220 on the loopback address (127.0.0.1) at a well-known port address. The primary process 200 can the periodically send messages to the TCP/IP connection 220, so that the watchdog process 210 can verify continued operation. The operation of the watchdog process 210 is illustrated in FIG. 4. At step 300, the watchdog process opens a TCP/IP connection with the primary process. At step 310, the watchdog process sends a message to the primary process through the TCP/IP connection. The watchdog process then awaits a reply message from the primary process, step 320. If the reply message is received, the watchdog process sends another message, after an appropriate delay. If the reply message is not received within an expected time, the recovery process is started at step 330. As in the first embodiment, the watchdog process may take different steps in attempting to correct operation of the primary process. At step 330, the watchdog process determines whether the primary process has failed before. If the primary process has not failed before, it is restarted at step 380. If the primary process has failed before (step 340), the watchdog process checks the configuration files and data at step 360 and makes any necessary corrections at step 370. After correction, the primary process is restarted at step 380. If the primary process has failed multiple times, a user is notified of the error at step 350, and the primary process is not restarted.

Having thus far described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. Accordingly, the invention is defined by the following claims and equivalents thereof.

What is claimed is:

1. A method for monitoring a software process in a computer system having an operating system, the method comprising the steps of:
 querying the operating system for a CPU usage rate for the software process being executed by the computer system;
 determining whether the software process is executing improperly based upon the CPU usage rate; and
 restarting the software process automatically when a determination is made that the software process is executing improperly.

2. The method for monitoring a software process according to claim 1, wherein the restarting includes terminating operation of the software process.

3. The method for monitoring a software process according to claim 1, wherein the restarting includes modifying a configuration file used by the software process.

4. The method for monitoring a software process according to claim 3, wherein the modifying includes verifying dependencies of the software process on system resources.

5. The method for monitoring a software process according to claim 1, further comprising providing a user notification if the software process is executing improperly.

6. The method for monitoring a software process according to claim 1, further comprising storing information regarding operation of the software process.

7. A computer implemented method for monitoring a software process in a computer system having an operating system, the method comprising the steps of:
 querying the operating system for a CPU usage rate for the software processes being executed by the computer system;
 determining whether the software process is executing properly based upon the CPU usage rate;
 altering a configuration file associated with the software process if the software process is not executing properly; and
 restarting the software process automatically after altering the configuration file.

8. The method for monitoring a software process according to claim 7, wherein the altering includes verifying dependencies of the software process on system resources.

9. The method for monitoring a software process according to claim 7, further comprising providing a user notification if the software process is not executing properly.

10. The method for monitoring a software process according to claim 7, further comprising altering a configuration file associated with the software process if the software process is not executing or is executing improperly.

11. A computer program product residing on a computer-readable medium and comprising computer-readable, computer-executable instructions for causing a computer to:
 issue a call to the operating system;
 receive a response to the call from the operating system;
 interpret the response to determine whether the software process is an executing process;
 interpret the response to determine a CPU usage rate if the software process is an executing process;
 compare the CPU usage rate to a desired range; and
 alter a configuration file used by the software process and restart the software process if the CPU usage rate is higher than the desired range.

12. The computer program product as in claim 11, further comprising instructions for causing the computer to terminate the operation of the software process.

13. The computer program product as in claim 12, further comprising instructions for causing the computer to verify dependencies of the software process on system resources.

14. The computer program product as in claim 11, further comprising instructions for causing the computer to provide a user notification.

15. The computer program product as in claim 11, further comprising instructions for causing the computer to issue a call to the operating system and receive a response from the operating system through a TCP/IP port.

16. A computer program product residing on a computer-readable medium and comprising computer-readable, computer-executable instructions for causing a computer to perform a first process by causing the computer to:
 access a computer operating system;
 retrieve first execution data from the computer operating system, the first execution data including information regarding a second process;
 use the first execution data to determine if the second process is executing and if so, then causing the computer to:
  a. retrieve a first CPU utilization data from the computer operating system; and
  b. compare the first CPU utilization data to a first range, and if the first CPU utilization data is higher than the first range then causing the causing the computer to:
   1. transmit a first instruction to the computer operating system to cause the operating system to terminate the second process;
   2. retrieve a set of parameters from a first configuration file for the second process;
   3. modify at least one of the parameters in the first configuration file to form a first modified file;
   4. store the first modified file with the modified parameters; and
   5. transmit a second instruction to the computer operating system to restart the second process, with the second process using the first modified file.

17. The computer program product as in claim 16, further comprising instructions for causing the computer to create and store a first process failure counter variable when the second process is started.

18. The computer program product as in claim 17, further comprising instructions for causing the computer to update the first process failure counter variable if the second process is not executing properly.

19. The computer program product as in claim 17, further comprising instructions for causing the computer to update the first process failure counter variable if the first CPU utilization data is higher than the first established range.

20. The computer program product as in claim 17, further comprising instructions for causing the computer to provide a user notification if the first process failure counter variable equals or exceeds a failure counter limit.

21. The computer program product as in claim 16, further comprising instructions for causing the computer to access the computer operating system through a TCP/IP port.

22. The computer program product as in claim 16, further comprising instructions for causing the computer to transmit a third instruction to the operating system to restart the second process if the second process is executing improperly.

23. The computer program product as in claim 16, further comprising instructions for causing the computer to:
retrieve second execution data from the computer operating system, the second execution data including information regarding a third process;
use the second execution data to determine if the third process is executing and if so then causing the computer to:
 a. retrieve a second CPU utilization data from the computer operating system; and
 b. compare the second CPU utilization data to a second range, and if the second CPU utilization data is higher than the second range then causing the causing the computer to:
  1. transmit a third instruction to the computer operating system to cause the operating system to terminate the third process;
  2. retrieve a set of parameters from a second configuration file for the third process;
  3. modify at least one of the parameters in the second configuration file to form a second modified file;
  4. store the second modified file; and
  5. transmit a fourth instruction to the computer operating system to restart the third process, with the third process using the second modified file.

24. The computer program product as in claim 23, wherein the third process is the first process of claim 16.

25. A fault tolerant computer system comprising:
at least one storage unit to store a process configuration file and a process failure variable;
at least one processor coupled to the storage unit, the processor being programmed to access an operating system, retrieve execution data from the operating system, interpret the execution data to determine whether a process is an executing process, interpret the execution data to determine a utilization rate of at least one processor, update the process failure variable, update the process configuration file, and start the process, using the updated process configuration file.

26. The fault tolerant computer system of claim 25, wherein the system is further programmed to:
determine whether the utilization rate of at least one processor is within a predetermined range; and
stop the process if the utilization rate is above the predetermined range.

27. The fault tolerant computer system of claim 25, wherein the system is further programmed to provide a user notification if the process failure counter variable exceeds a failure counter limit.

* * * * *